US005513305A

United States Patent [19]

Maghbouleh

[11] Patent Number: 5,513,305

[45] Date of Patent: Apr. 30, 1996

[54] SYSTEM AND METHOD FOR DOCUMENTING AND DISPLAYING COMPUTER PROGRAM CODE

[75] Inventor: Arman Maghbouleh, Stanford, Calif.

[73] Assignee: Apple Computer, Inc., Cupertino, Calif.

[21] Appl. No.: 204,758

[22] Filed: Mar. 1, 1994

[51] Int. Cl.$^{6}$ .................................................... G06F 15/00

[52] U.S. Cl. ............................................ 395/145; 395/157

[58] Field of Search .................................... 395/144–148, 395/155–157, 160, 161

[56] References Cited

U.S. PATENT DOCUMENTS

| | | | |
|---|---|---|---|
| 4,860,203 | 8/1989 | Corrigan et al. | 395/700 |
| 5,146,552 | 9/1992 | Cassorla et al. | 395/145 |
| 5,191,646 | 3/1993 | Naito et al. | 395/161 |
| 5,297,249 | 3/1994 | Bernstein et al. | 395/156 |
| 5,307,493 | 4/1994 | Gusenius | 395/700 |
| 5,367,623 | 11/1994 | Iwai et al. | 395/157 |
| 5,442,738 | 8/1995 | Chapman et al. | 395/135 |

OTHER PUBLICATIONS

Lougher et al., "Group Support for the Recording and Sharing of Maintenance Rationale", *Software Engineering Journal*,. v. 8, n. 6, pp. 295–306, Nov. 1993.

Brade et al. "Whorf: A Visualization Tool for Software Maintenance", Proc. of 1992 IEEE Workshop on Visual Languages, pp. 148–154, Sep. 15, 1992.

Cutillo et al, "Identification and Extraction of 'Domain Independent' Components in Large Programs", Proc. of Working Conf. on Reverse Engineering, pp. 83–92, May 21, 1993.

Fletton et al., Redocumenting Software Systems using Hypertext Technology; Proc. of Conf. on Software Maintenance,–1988,pp. 54–59, Oct. 24, 1988.

Garg et al,"A Hypertext System to Manage Software Life––Cycle Documents", IEEE Software, v. 7, n. 3, pp. 90–98, May 1990.

Bigelow, "Hypertext and CASE", IEEE Software, v. 5, n. 2, pp. 23–27, Mar. 1988.

*Primary Examiner*—Mark K. Zimmerman
*Assistant Examiner*—Joseph R. Burwell
*Attorney, Agent, or Firm*—Greg T. Sueoka

[57] ABSTRACT

A system and method for documenting and displaying computer program code comprises a token annotation unit, a comment analyzer, a token parsing library, and a code outline unit. The token parsing library parses a program comprising related program code files into a set of constituent tokens. The token annotation unit selectively associates one or more annotations with tokens in a program by creating a token annotation object. When program code is displayed, the token annotation unit visually identifies each annotated token present according to a display style. The token annotation unit presents annotations corresponding to an annotated token in response to the selection of the annotated token during program code display.

20 Claims, 13 Drawing Sheets

| | |
|---|---|
| Identifier #1 | Token Name |
| Identifier #2 | Token Type |
| Identifier #3 | Token Scope |
| Identifier #4 | Pointer to Annotation |
| Identifier #5 | Text |
| Identifier #6 | Display Parameters |
| Identifier #7 | Annotation Scope |
| Identifier #8 | Application Program |

```
.
.
.
/* calculations for circle & cylinder */

area1 = circlearea (radius);

volume1 = cylvolume (height, radius);
.
.
.
```

88

| | |
|---|---|
| Identifier A | Title |
| Identifier B | Level Indicator |
| Identifier C | Scope |
| Identifier D | Filename |
| Identifier E | Explanation |
| Identifier F | Annotation Pointer |
| Identifier G | Project Name |

FIG. 6

SYSTEM AND METHOD FOR DOCUMENTING AND DISPLAYING COMPUTER PROGRAM CODE

BACKGROUND OF THE INVENTION

1. Field of the Invention

The present invention relates generally to systems and methods for providing file documentation, and more particularly to systems and methods for adding comments to computer program code. Still more particularly, the present invention is a system and method for documenting and displaying computer program code.

2. Description of the Background Art

Computer programs often exhibit complex internal functional organizations and information flows. A person attempting to understand a program's internal behavior may therefore face a difficult task. Unfortunately, the program code, which is the most complete description of the program, is not by itself the best description of a program to a person. A person often has difficulties understanding how various blocks of program code are interrelated, or how a particular programming language construct is being used in a given situation. Many hours may be required to decipher and understand interrelated blocks of program code, which are often scattered among different files. In object-oriented programming languages, subtle interactions between various object class hierarchies often affect program control flow in intricate ways. Thus, deciphering object-oriented program code can be particularly difficult.

Program code documentation plays a vital role in making programs easier to understand. Programming languages generally provide a basic documenting capability by which programmers can insert textual comments into program code. The textual comments are typically placed "in-line" immediately preceding or following a possible point of confusion. A given programming language construct such as a variable, function, or class may appear many times in a program. Commenting on each occurrence of a particular variable, function, or class can be a very tedious task. Thus, programmers typically provide only sparse comments or do not fully comment every instance of a given programming language construct. A few programming languages, most notably common LISP, provide a means for automatically associating a textual comment with each occurrence of a function or variable that has been defined globally. However, no similar commenting capability is provided for locally defined functions or variables.

As comments become more detailed or more numerous, they visually interfere with a program code organization or format that the programmer uses to identify program code blocks. Commenting can therefore make computer program code more difficult to decipher or even unreadable. As a result, comments are often made more brief than needed, and only summarize important information. In addition, because comments are typically quite localized, they convey little information related to overall program organization. Thus, even when comments are present, an undesirable amount of time is required to understand and interrelate blocks of program code. Moreover, the commenting capabilities currently provided by programming languages do not allow programmers to portray non-textual information that is useful for program code understanding, such as a flowchart. Therefore, commenting capabilities provided by existing programming languages are generally inadequate for providing in-depth descriptions of program code functionality and organization.

Some program development environments use hypercomments as an approach to make program code more understandable. In such program development environments, a textual comment can be defined once for a particular string of characters representing a programming language construct. For each occurrence of the particular string of characters in the program, the user can select the string, and the program development environment locates the corresponding comment through string matching. As an example, if a user defines a comment for a function named "foo" in a program, the program development environment will look up the text corresponding to the string "foo" whenever the user selects the string "foo" within the program.

In a computer program, semantically different programming language constructs often share an identical name. Thus, a given function, a global variable, and a local variable may each share the same name. For example, a local variable named "foo" may exist within the function named "foo" described above. Identically-named programming language constructs should be commented differently when they are semantically different. Unfortunately, program development environments that provide hypercommenting functionality cannot determine whether programming language constructs having the same name are semantically related. Program development environments that rely upon hypercommenting therefore do not provide an adequate solution to the problem of making program code easier to understand.

What is needed is a means for making program code understandable that does not visually interfere with program code organization or readability, that enables a programmer to convey descriptive information in multiple ways, and that can determine whether identically-named programming language constructs are related.

SUMMARY OF THE INVENTION

The present invention is a system and method for documenting and displaying program code. In response to the selection of a token in a program, the present invention selectively associates one or more annotations with the token. Annotations can include text, pictures, sound, animations, and movies. A given annotation is associated with a particular token only once. Thereafter, for each occurrence of the annotated token within the program, the present invention automatically retrieves each of the token's annotations upon request. For each annotation associated with a token, the present invention creates and stores a token annotation object that specifies a token name, a token type, a token scope, and a reference to the annotation. The present invention can distinguish between different tokens having an identical token name by examining their token types and token scopes.

The present invention also documents program code by defining a set of outline nodes that form a program outline. Each outline node corresponds to a block of program code. The present invention can also associate an explanation and an annotation with an outline node upon request. When an outline node is defined, the present invention creates an outline node object that includes a title, a reference to a corresponding program code block, and an outline level that specifies the location of the outline node in the outline. The present invention displays a program outline, and selectively retrieves the explanation and the annotation associated with each outline node. The present invention can also selectively display the program code block corresponding to an outline node, and retrieve any annotations for annotated tokens contained therein.

The system of the present invention preferably comprises a code documentation editor. The code documentation editor comprises a user interface unit, a token annotation unit, a code outline unit, a token parsing library, and a parsing results database. The user interface unit generates and displays a set of menus and windows that allow a user to input data and commands into the system. The user interface unit also enables a user to create and view program code under the direction of the token annotation unit. The token annotation unit creates and stores each token annotation object, directs the display of program code and any annotated tokens contained therein, and retrieves each annotation associated with an annotated token upon request. The token parsing library parses program code files into their constituent tokens, and stores corresponding parsing results in the parsing results database. The token parsing library also determines a token name, a token type, and a token scope for the each token. The code outline unit creates and stores each outline node object, and directs program outline display and editing.

A preferred method for displaying and annotating program code in accordance with the present invention comprises the steps of: parsing a program code file into its constituent program code blocks and tokens; associating an annotation with a token in response to the token's selection; visually identifying annotated tokens in displayed program code according to a set of display styles; determining whether an annotated token has been selected; and retrieving a corresponding annotation in the event that the annotated token has been selected.

BRIEF DESCRIPTION OF THE DRAWINGS

FIG. 3 is a block diagram showing a preferred embodiment of a token annotation object in the present invention;

FIG. 6 is a block diagram showing a preferred embodiment of an outline node object in the present invention;

DETAILED DESCRIPTION OF THE PREFERRED EMBODIMENTS

In the present invention, a program comprises program code stored in one or more related program code files. To form an executable program, the program's related program code files are compiled and linked together. Program code is written in accordance with a programming language. In a given programming language, the smallest indivisible syntactical element of program code is referred to herein as a token. For example, in the following exemplary program code,

```
myvar=1;
```

the elements "myvar," "=," "1," and ";" are tokens. Thus, there are four tokens present in the exemplary program code above.

In the present invention, an annotation is data that explains the behavior or organization of program code within a program. Various types of annotations are supported, including text, sound, movies, and animations. The present invention associates one or more annotations with a token in a program upon request. The process of associating an annotation with a given token is referred to herein as annotating the given token. Once an annotation has been associated with a particular token, that token is referred to herein as being annotated.

Figure 1:
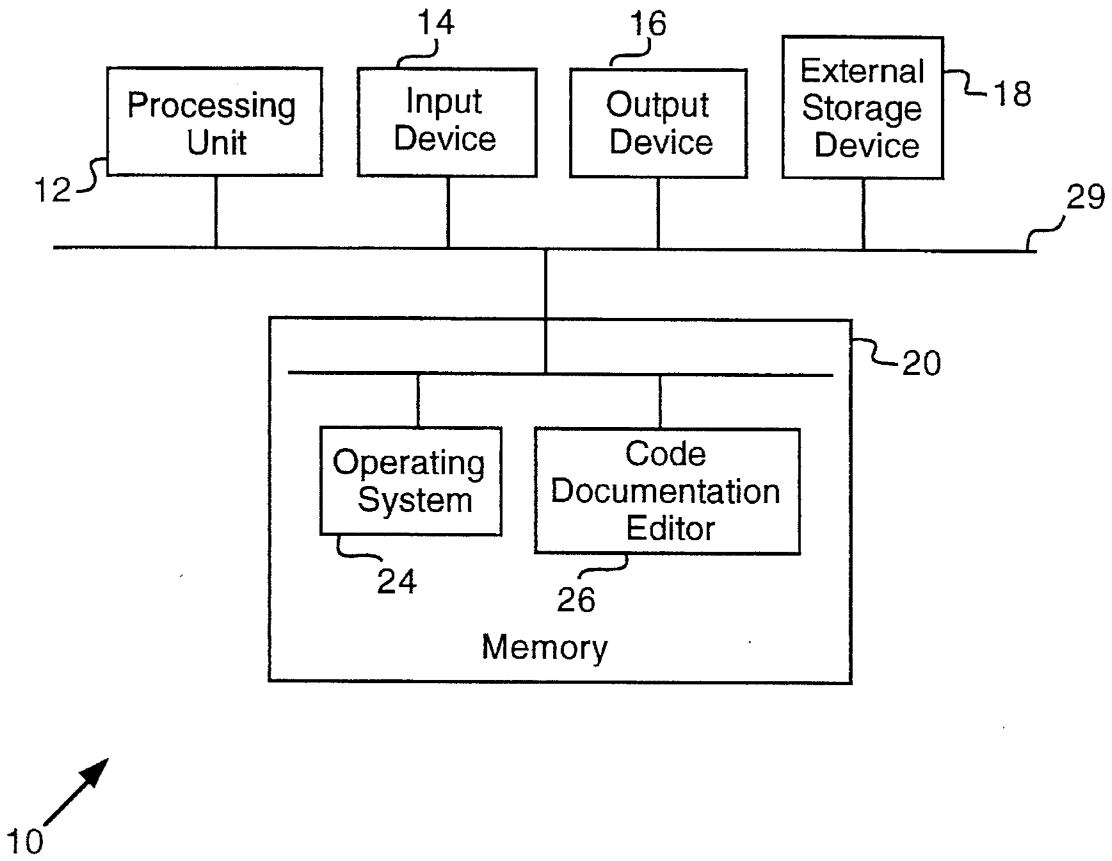
FIG. 1 is a block diagram of a preferred embodiment of a system for documenting and displaying computer program code constructed in accordance with the present invention.

Referring now to FIG. 1, a block diagram of a preferred embodiment of a system 10 for documenting and displaying computer program code constructed in accordance with the present invention is shown. The system 10 preferably comprises a processing unit 12, an input device 14, an output device 16, an external storage device 18, and a memory 20 wherein an operating system 24 and a code documentation editor 26 reside. Each element of the system 10 has an input and an output coupled to a common system bus 29. In the preferred embodiment, the operating system 24 provides a set of textual, auditory, graphical, and video information presentation services to the system 10. In addition, the output device 16 is capable of presenting textual, auditory, graphical, and video information to a user. In an exemplary embodiment, the system 10 is an Apple Macintosh computer made by Apple Computer, Inc., of Cupertino, Calif., having a Motorola 68030 central processing unit, a System 7 operating system, a keyboard, a mouse, a high resolution color video monitor, an 80 Mbyte hard disk drive, and 8 Mbytes of Random Access Memory (RAM) wherein the code documentation editor 26 and the operating system reside.

Figure 2:
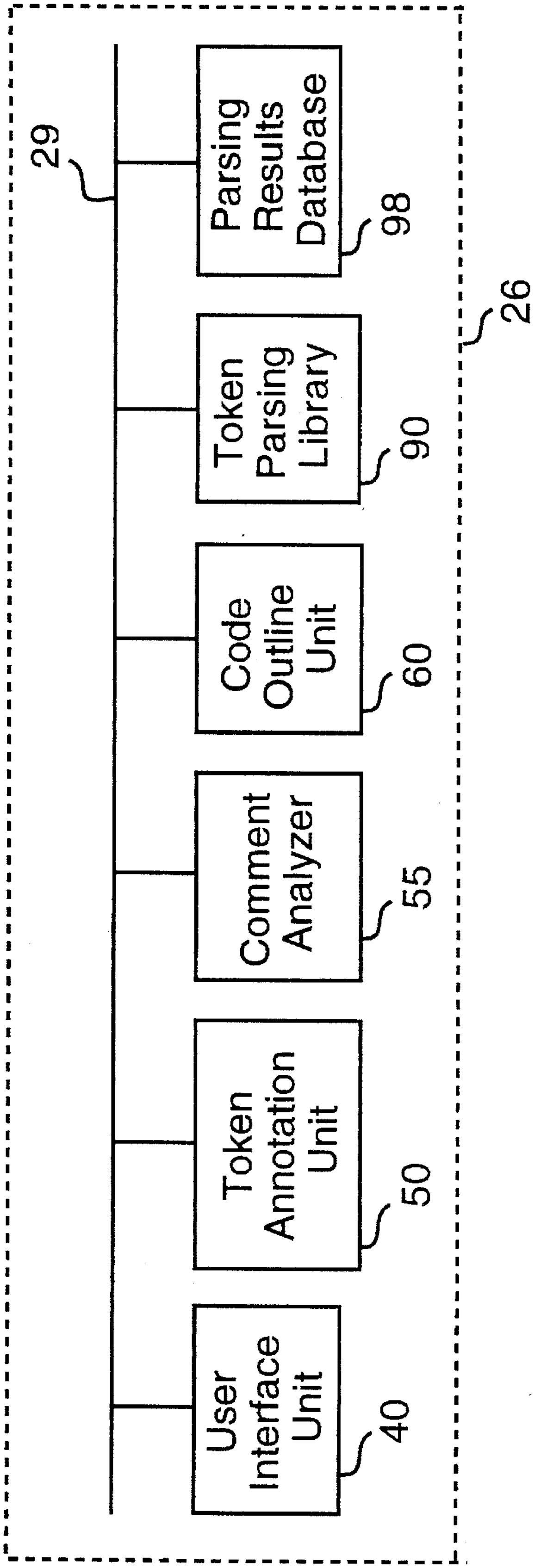
FIG. 2 is a block diagram of a preferred embodiment of a code documentation editor in the present invention.

In the preferred embodiment of the system 10, program code files and data files containing annotations are stored either on the external storage device 18 or in the memory 20. The code documentation editor 26 facilitates program creation, documentation, display, and editing. Referring now to FIG. 2, a block diagram of a preferred embodiment of the code documentation editor 26 is shown. The code documentation editor 26 preferably comprises a computer program having steps that are selectively executed by the processing unit 12 during program code documentation and display. The code documentation editor 26 comprises a user interface unit 40, a token annotation unit 50, a comment analyzer 55, a code outline unit 60, a token parsing library 90, and a parsing results database 98. Each element of the code documentation editor 26 has an input and an output coupled to the common system bus 29.

The user interface unit 40 generates and displays a set of menus and windows on the output device 16 that facilitate the inputting of data and commands for documenting and displaying program code via the input device 14. Through the user interface unit 40, a user can create, open, view, edit, annotate, and save program code files.

The token parsing library 90 parses or deciphers program code into its constituent tokens. In the preferred embodiment, the token parsing library 90 comprises a conventional parser having callback capabilities and a comment analyzer. In an exemplary embodiment, the token parsing library 90 is capable of parsing program code written in accordance with the C and C++ programming languages. Those skilled in the art will recognize that the present invention can be adapted to any programming language.

The token parsing library 90 can identify and characterize each token present in a file according to a token name, a token type, and a token scope. The token parsing library 90 stores the combination of a token name, a token type, and a token scope for a given token as a token record. The token name is preferably the set of characters or character string in the program code that identify the token. The token type is a set of characters that indicates how the token is used in the program code, providing a categorization of the token according the token's relationship to the structure of the programming language. For example, token types can include "variable," "function," "comment," and "preprocessor directive" in C or C++. Token types are not to be confused with a programming language's data types.

In a computer program, a particular token is defined only within a predetermined block of program code. Outside of the block of program code in which it is defined, the token has no meaning. Each programming language provides rules for defining various types of program code blocks, and for specifying whether a given token is meaningful in any program code block that has been defined. Each type of program code block supported by a given programming language defines a scope or context in which the tokens contained therein have meaning. For example, in C++, a file scope, a template scope, a class scope, a method or function scope, and an unnamed block scope are recognized. Programming languages typically allow a given scope to be logically nested within a previously listed scope even though the actual program code may not be nested.

For a given token, the token scope preferably specifies the given scope in the program in which the token has meaning, and specifies the manner in which the given scope is nested within any other scopes. The token parsing library 90 recognizes the different scopes in a program code file according to the block definition rules in a particular programming language, and can determine for each token its corresponding token scope. Tokens having identical token names and token types but differing in their respective token scopes are semantically different. Tokens having identical token names, token types, and token scopes are semantically equivalent. In the preferred embodiment, the token scope is a character string having a predetermined format according to the type of the given scope in which the token is defined and the types of scopes within which the given scope is nested. In program code written in the C++ programming language, for example, an exemplary token scope character string specifying the token scope for a local variable having a token type of "variable" is preferably of the format "class::function(parameter types)." In the exemplary token scope character string, "function" indicates the particular function that the local variable is declared in, and "class" indicates the class within which the function is defined. Preferably, a scope marker separates each scope contained in the token scope character string, where the particular format of each scope marker corresponds to scope type. In the exemplary token scope character string, the scope markers present are "::" which corresponds to class scopes, and "( )" which corresponds to function or method scopes. In the preferred embodiment, the scope marker "<>" corresponds to template scopes, and "{}" corresponds to unnamed blocks. No scope marker is needed for a file scope because the file scope is defined globally.

In the preferred embodiment, the token parsing library 90 performs a partial program parsing when a program code file corresponding to a given program is first opened. Through the partial program parsing, the token parsing library 90 preferably generates class hierarchy information and a set of program scopes corresponding to a program code block structure present in the program. For program code written in C++, the set of program scopes preferably corresponds to the locations of the program code's constituent function definitions, class definitions, and unnamed blocks. In response to a user command, or in response to the selection of a token in a program code file as will be described below, the token parsing library 90 fully parses each related program code file in a program. The parsing results generated by the full parsing include the token record for each token in the program. The full parsing results also include an annotated token list that is generated by the comment analyzer 55. The annotated token list specifies tokens in the program that have been annotated. The comment analyzer 55 and the annotated token list are described in detail below. The token parsing library 90 stores parsing results in the parsing results database 98.

The token annotation unit 50 selectively associates annotations with tokens in a program. Annotations in the present invention can include text, pictures, sounds, animations, and movies. The user interface unit 40 provides text editing functions for the creation and editing of text annotations. Other types of annotations are preferably generated and edited via an appropriate application program. Each annotation serves to explain how its corresponding annotated token relates to a subset of the program code comprising the program, or provides other information that may be useful to a person attempting to understand the program. After a selected token has been annotated, the token annotation unit 50 retrieves the selected token's annotations upon request. The token annotation unit 50 also selectively presents annotations on the output device 16 and facilitates annotation editing.

When a portion of a program code file is displayed on the output device 16, the token parsing library 90 determines the token name, token type, and token scope in response to the selection of a token with the input device 14. If the program that includes the program code file has been fully parsed prior to the selection of the token, the token parsing library 90 preferably retrieves the appropriate token record from the parsing results database 98 to determine this information. Otherwise, the token parsing library 90 fully parses each related program code file in the program prior to retrieving the appropriate token record. After the token name, token type, and token scope have been determined, the token annotation unit 50 determines whether a user command has been selected via the input device 14. Preferably, each user command available for selection is presented on the output device 16 via the set of menus generated by the user interface unit 40. Once the token annotation unit 50 has determined that a user command has been selected, the token annotation unit 50 selectively performs program code documentation and display functions according to the specific command received.

In response to a user command for annotating the selected token, the user interface unit 40 generates a first dialog box on the output device 16 to facilitate the identification of a data file containing an annotation that is to be associated with the selected token. Preferably, for a text annotation, the user interface unit 40 can accept text directly entered into the first dialog box via the input device 14 as the text annotation itself. After a given data file, and therefore a given annotation, has been identified, the token annotation unit 50 determines whether the scope immediately enclosing the selected token is the scope in which the selected token is declared. If the selected token is declared in the immediately enclosing scope, the token annotation unit 50 uses the immediately enclosing scope as the token scope for the selected token. If the selected token is located in a subset of the scope in which the selected token is declared, the user interface unit 40 generates a second dialog box on the output device 16 that facilitates the identification of an annotation scope. The annotation scope indicates whether the annotation is to be associated with the selected token only within the subset of the token scope for the selected token. For example, if a class variable that is used in a special manner within a particular class method is being annotated, the annotation scope could indicate that the annotation is to be associated only with those occurrences of the class variable within that particular class method. Identification of an annotation scope is optional. If no annotation scope is identified, the annotation is associated with each occurrence of the selected token according to the corresponding token type and token scope.

After a given annotation and any annotation scope have been identified, the token annotation unit 50 creates a corresponding token annotation object 52. Referring now to FIG. 3, a block diagram of a preferred embodiment of a token annotation object 52 is shown. The token annotation object 52 is a data structure used to associate the selected token with the given annotation. The token annotation object 52 comprises a set of data fields, where each data field specifies information related to the selected token or to the corresponding annotation. Separate data fields specify the token name; the token type; the token scope; and a pointer to the data file containing the corresponding annotation. In the preferred embodiment, a text annotation can be selectively stored directly in the token annotation object 52 or in a text file; thus, a data field is present for a text annotation in the event that the text annotation is to be stored in the token annotation object 52 itself. In addition to the data fields described above, additional data fields optionally specify annotation display parameters such as the size of a window the annotation is to appear in; the annotation scope; and a reference to an application program in which the annotation was originally created. In the preferred embodiment, a unique data field identifier precedes each data field. A given token can have a number of associated annotations. For each annotation associated with the token, the token annotation unit 50 creates a corresponding token annotation object 52 as described above.

The token annotation unit 50 stores each token annotation object 52 either in the program code file itself, or in a separate token annotation object file. In the preferred embodiment, the token annotation unit 50 selectively determines the token annotation object storage location according to a user command. When token annotation objects 52 are stored in the program code file itself, the token annotation object 52 is embedded in a comment in accordance with the programming language's manner of commenting. This ensures that a compiler is not affected by the presence of token annotation objects in a program code file. Thus, the present invention does not interfere with the process of program development.

When conventional parsers perform a program code file parsing, comments embedded in the program code file are ignored. In the present invention, the token parsing library 90 supports callbacks. Those skilled in the art will recognize that callbacks are a conventional a means for customizing the operation of a parser. During the parsing of a program code file, the token parsing library 90 preferably transfers control to the comment analyzer 55 via a callback when a comment is encountered. The comment analyzer 94 determines whether the comment includes a token annotation object 52. If the comment includes a token annotation object 52, the comment analyzer 94 adds a copy of the token annotation object 52 to the annotated token list. Thus, the annotated token list contains a copy of the token annotation object 52 for those tokens in the program that have corresponding token annotation objects 52 embedded within comments.

In an alternate embodiment, token annotation objects 52 could be modified to include one or more additional data fields and corresponding data field identifiers. The additional data fields would provide instructions to the comment analyzer 55 and the token parsing library 90 as to how the token annotation object 52 is to be associated with a token. These instructions could specify a particular instance of a token, or could specify that a next or a previous instance of a token according to token type. For example, an instruction could specify that the annotation indicated in the token annotation object 52 is to be associated with the next function encountered in the program. The token name, token type, and token scope would not need to be explicitly provided in the token annotation object 52. A programmer could then annotate tokens "in-line" while programming by placing a token annotation object 52 of this type in an in-line comment. As before, the comment analyzer 55 would analyze the token annotation object 52 after the token parsing library 90 has encountered the in-line comment. Based upon the instructions contained in the additional data fields, the comment analyzer 55 would obtain the appropriate token name, token type, and the token scope for a particular token from the token parsing library 90. The comment analyzer 55 would then add a copy of the token annotation object 52 to the annotated token list, where the copy of the token annotation object 55 explicitly provides the token name, the token type, and the token scope obtained from the token parsing library 90.

The token annotation unit 50 also directs program code display. When a program code file corresponding to a given program is first opened, the token parsing library 90 parses the program in the manner described above. The token annotation unit 50 subsequently determines the location of each annotated token in the program code file and the types of each annotated token's corresponding annotations. This determination is preferably made by comparing the contents of the annotated token list and each token annotation object file associated with the program with the token record for each token in the program code file. The code annotation unit 50 next generates a set of display styles for the program code file based upon the types of annotations present for each annotated token in the program code file. The token annotation unit 50 preferably stores the set of display styles in the memory 20. After generating and storing the set of display styles, the token annotation unit 50 displays the program code in the program code file. During program code display, the token annotation unit 50 visually identifies each annotated token present according to the set of display styles, that is, the token annotation unit displays each annotated token in a visually distinct manner.

Figures 4A, 4B:
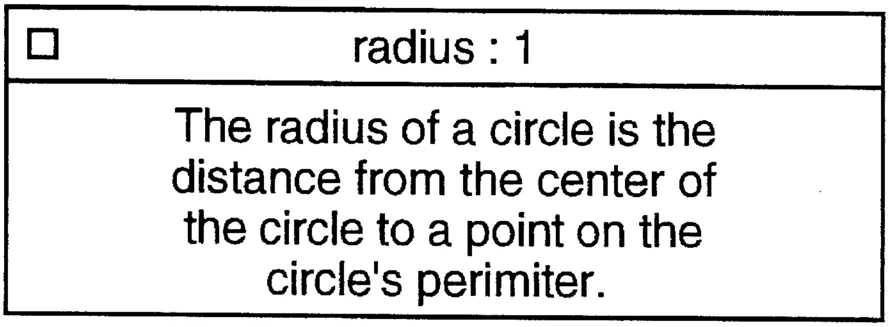
FIG. 4A is an exemplary portion of a program code file including annotated tokens.
FIG. 4B is a graphical representation of an output device showing an exemplary text annotation presented in a window for a token in FIG. 4A.

Referring now to FIG. 4A, an exemplary portion of a program code file wherein tokens have been annotated is shown according to a preferred set of display styles. The preferred set of display styles specifies that each annotated token present is underlined when displayed, and that tokens having multiple annotations are underlined twice. As shown in FIG. 4A, the tokens identified by the preferred set of display styles are "circlearea" and "radius," and the "radius" token has been annotated more than once. In the preferred embodiment, the preferred set of display styles can also include a color-coding (not shown) for each token according to the type of annotation associated with the token. For example, a token having a sound annotation may be color-coded yellow, while a token having a picture annotation may be color-coded blue. When multiple annotations are present for a single token, the token is preferably underlined twice. Those skilled in the art will recognize that other display styles such as the use of bold text, italics, or different fonts could be used in an alternate embodiment.

In the preferred embodiment, the token parsing library 90 determines the selected token's corresponding token record in response to the selection of a displayed token as described above. After the token record for the selected token has been determined, the token annotation unit 50 selectively associates an annotation with the selected token in response to a user command as described above. Once a selected token has been annotated, the token annotation unit 50 updates the set of display styles such that each occurrence of the newly-annotated token in the program code file is visually identified when displayed.

If the selected token has corresponding annotations, the token annotation unit 50 presents the annotations on the output device 16 in response to an appropriate user command. Preferably, the user command corresponds to a menu item generated by the user interface unit 40. When a user command for annotation viewing is received, the token annotation unit 50 searches for a token annotation object 52 having data fields that match the token record for the selected token. In the preferred embodiment, the annotated token list and each token annotation object file related to the program is searched.

When a token annotation object 52 having data fields that match the selected token's token record is found, the token annotation unit 50 retrieves the annotation referenced within the corresponding token annotation object 52. If the token annotation unit 50 finds only one token annotation object 52 having matching data fields during the search, the token annotation unit 50 presents the retrieved annotation on the output device 16 immediately after the annotation's retrieval. When multiple token annotation objects 52 having matching data fields are found, the user interface unit 50 generates a third dialog box that lists each retrieved annotation. In response to the selection of a retrieved annotation listed in the third dialog box, the token annotation unit 50 presents the retrieved annotation on the output device 16.

Figure 4C:
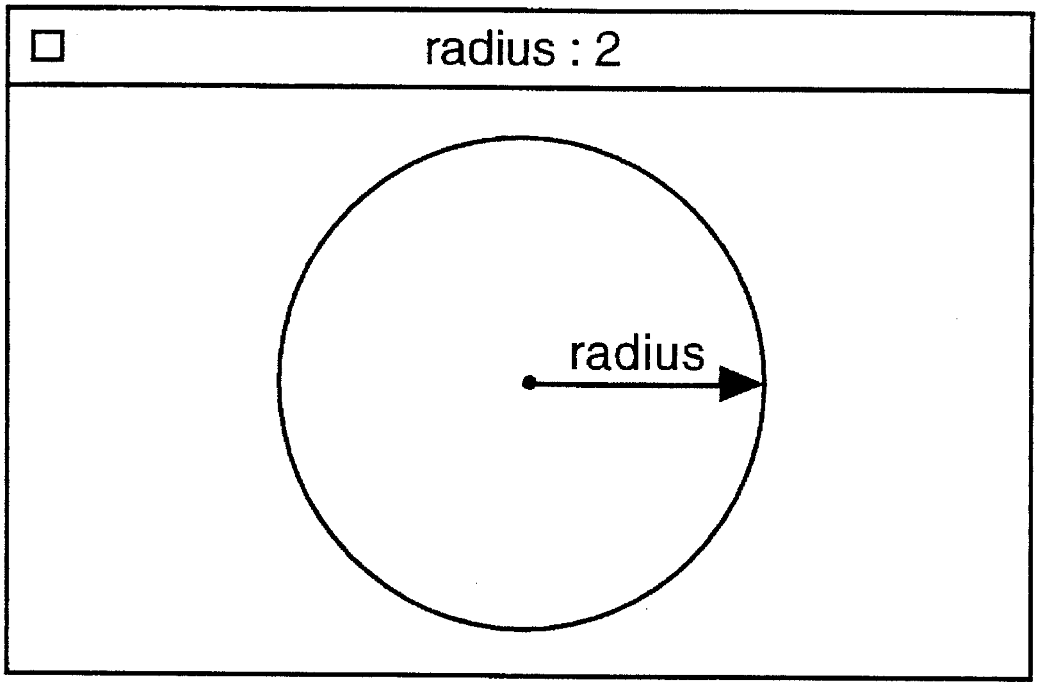
FIG. 4C is a graphical representation of an output device showing an exemplary picture annotation presented in a window for the token in FIG. 4B.

In the preferred embodiment, the token annotation unit 50 presents text, movie, and animation annotations in corresponding windows. Those skilled in the art will recognize that in an alternate embodiment, annotations can be presented in a single window that is used over and over again. In the preferred embodiment, the window shows the token name in addition to presenting the annotation. When the window corresponds to one of multiple retrieved annotations for the selected token, the token annotation unit 50 preferably distinguishes which retrieved annotation is presented by including a number in the window. Referring now to FIG. 4B, a graphical representation of the output device 16 showing an exemplary text annotation presented in a window for the "radius" token in FIG. 4A is shown. The text annotation textually explains the concept of a radius. Referring also now to FIG. 4C, a graphical representation of the output device 16 showing an exemplary picture annotation presented in a window for the "radius" token in FIG. 4A is shown. The exemplary picture annotation visually explains the concept of a radius. Together, the exemplary text annotation and the exemplary picture annotation serve to explain the "radius" token in detail. Those skilled in the art will recognize that the exemplary annotations considered herein could include additional information as desired. The token annotation unit 50 recognizes that the viewing of a given annotation is complete when the annotation's window is closed.

In the preferred embodiment, if any annotated tokens other than the selected token also appear in a text annotation, each annotated token is displayed according to the preferred set of display styles when shown in the text annotation. The token annotation unit 50 selectively retrieves any annotations associated with each annotated token displayed in the text annotation in the same manner as indicated above.

The token annotation unit 50 selectively deletes one or more token annotation objects 52 corresponding to the selected token in response to an appropriate user command. The token annotation unit 50 also facilitates the editing of an annotation associated with the selected token in response to an appropriate user command. If annotation editing is required, the token annotation unit 50 invokes the application program that was used to create the annotation. Because the token annotation object 52 contains a pointer to its corresponding annotation, the same token annotation object 52 remains valid even after the annotation has been modified. Thus, no new token annotation object 52 is created when an annotation is modified.

A given token may occur multiple times in a program code file. Through the set of display styles, the token annotation unit 50 visually identifies each occurrence of each annotated token in the program code file when the program code file is displayed. Annotations corresponding to a given token are not presented unless the token annotation unit 50 determines that a user command indicating that annotation presentation is required has been received. Thus, the present invention does not interfere with the visual appearance of code organization that a programmer desires to communicate. This in turn allows the use of very detailed annotations that successfully explain program code behavior, thereby minimizing the amount of time required to understand the program code.

When an annotated token is selected, the token parsing library 90 determines the selected token's corresponding token record comprising the token name, the token type, and the token scope. Because the token record is based upon parsing results, the present invention can distinguish between tokens having identical token names and token types according to their respective token scopes. In prior art program development environments that support hypercommenting, tokens are distinguishable only according to the character strings that identify the tokens in the program code. Thus, in prior art hypercommenting program development environments, identically named yet semantically different tokens cannot receive appropriately unique comments. Moreover, in the prior art, no system or method supports the combination of text, sound, picture, and movie annotations for explaining program code organization and behavior. The present invention provides complete program code documentation capabilities, even for tokens having identical token names and token types, by supporting any type of annotation and by distinguishing between tokens according to their respective semantics.

After the token record for a selected token has been determined, the token annotation unit 50 can locate each of the selected token's annotations regardless of the selected token's location in a program. Therefore, the present invention ensures that annotations corresponding to a particular token are not localized to the specific location in the program at which the token was first annotated. Regardless of the number of times the selected token appears in the program, only one token annotation object is created and stored for each of the selected token's annotations.

Figure 5:
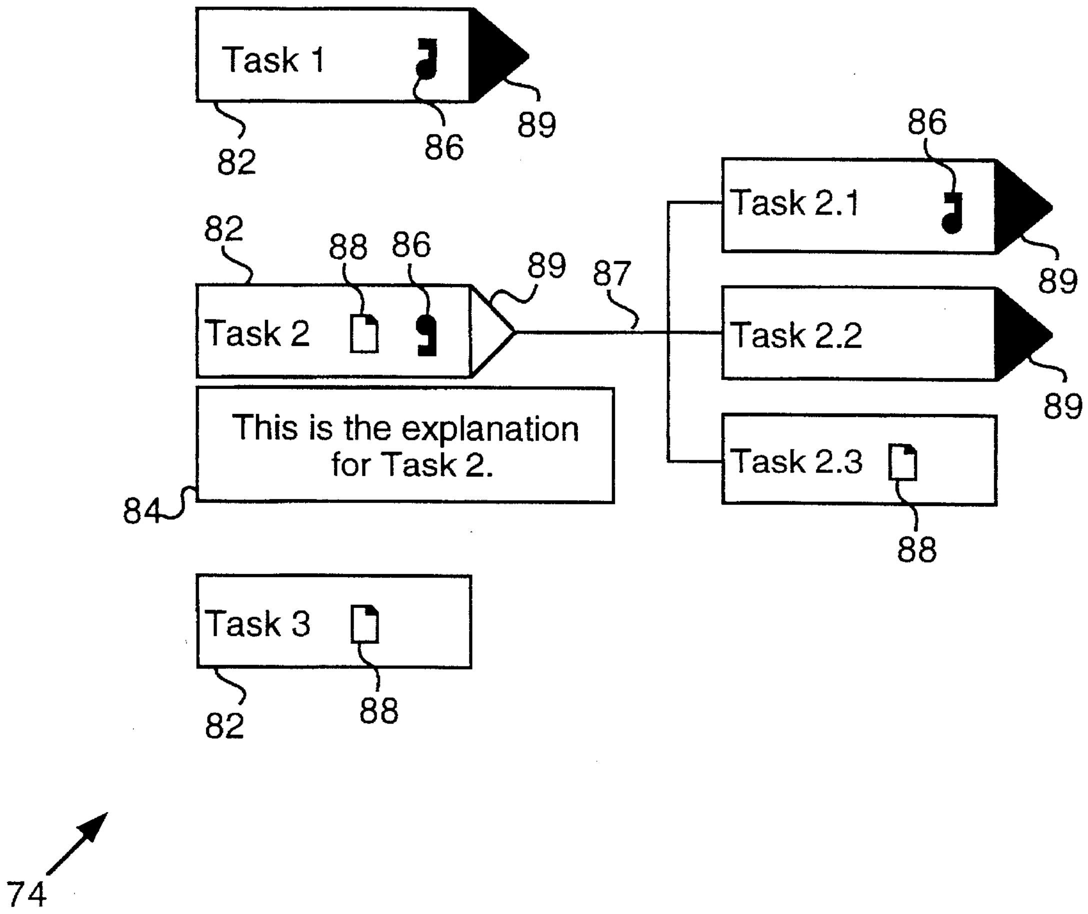
FIG. 5 is an exemplary program outline presented in a preferred graphical format in the present invention.

The code outline unit 70 further documents and displays program code by creating, displaying, annotating, and editing a program outline. Referring now to FIG. 5, an exemplary program outline presented in a preferred graphical format 74 is shown. Those skilled in the art will recognize that the program outline can be presented in a variety of other formats, such as a textual format, as well. The code outline unit 70 presents the program outline as a set of outline nodes 80 in response to a user command entered via the input device 14. Each node outline includes a title, an optional explanation, and an optional annotation. Each outline node 80 occupies a given outline level that corresponds to a relative display position in the program outline. The code outline unit 70 associates each outline node 80 with a block of program code, as will be described below. For each outline node 80, the code outline unit 70 creates and maintains a corresponding outline node object 88 in the memory 20. Thus, each outline node 80 is a graphical representation of a corresponding outline node object 88.

Referring now to FIG. 6, a block diagram of a preferred embodiment of an outline node object 88 is shown. Each outline node object 88 comprises a set of outline node data fields that will be described below. In the preferred embodiment, each outline node data field begins with a unique outline node data field identifier. The code outline unit 70 creates an outline node object 88 in response to a user command entered via the input device 14. After creating an outline node object 88, the user interface unit 40 generates a fourth dialog box to facilitate the identification of a title and the outline level for the outline node 80. Once a title and the outline level for the outline node 80 has been identified, the code outline unit 70 assigns the title to a first outline node data field, and assigns the outline level to a second outline node data field. In the preferred embodiment, each outline node object 88 is stored sequentially in a corresponding program outline file. When a program outline file is opened, the code outline unit 70 displays each outline node 80 according to the order of the outline node objects 88 in the program outline file. Within each outline node object 88, the outline level specifies the display position (left-to-right) associated with the outline node object 88 relative to the display position associated with the preceding outline node object 88 in the sequentially ordered program outline file. The outline level therefore defines a relationship between outline nodes 80. A given outline node 80 may be at the same outline level, a deeper outline level, or a shallower outline level than the preceding outline node 80. For example, in FIG. 5, the outline node objects 88 corresponding to the outline nodes 80 having the titles "Task 2," "Task 2.1," "Task 2,2," and "Task 2.3" are stored sequentially in their respective order of display. Within the outline node object 88 containing the title "Task 2.1," the outline level specifies a display position one outline level deeper than that associated with the preceding outline node object 88 containing the title "Task 2." In a like manner, within the outline node object 88 containing the title "Task 2.2," the outline level specifies a display position at the same outline level as that associated with the preceding outline node object 88 containing the title "Task 2.1."

After the title and the outline level have been assigned to their respective outline node object data fields, the user interface unit 40 generates a fifth dialog box on the output device 16 that facilitates the selection of a program code file. Once a program code file has been selected, the token parsing library 90 performs a partial parsing of the selected program code file and each related program code file to determine the set of program scopes if the selected program code file is not already open. The user interface unit 40 generates a sixth dialog box on the output device 16 that lists the program scopes contained in the selected program code file. In response to the selection of one of the program scopes listed in the sixth dialog box, the code outline unit 70 assigns the selected scope to a third outline node object data field. In addition, the code outline unit 70 assigns the filename of the program code file to a fourth outline node object data field.

The code outline unit 70 assigns an optional explanation to a fifth outline node object data field in response to a user command indicating that an explanation is required for the outline node 80. The explanation preferably provides more detailed information about the outline node 80 and the functionality of its corresponding block of program code than can be provided by the outline node's title.

Receipt of a user command indicating that the outline node 80 is to be annotated with an annotation causes the user interface unit 40 to generate the first dialog box as was described earlier that facilitates the identification of a data file containing an annotation. Preferably, a text annotation, a sound annotation, a picture annotation, a movie annotation, or an animation annotation can be associated with the outline node object 80. After a given data file, and hence a given annotation has been identified, the code outline unit 70 assigns a pointer to the data file containing the desired annotation to a sixth outline node object data field.

Finally, the code outline unit 70 assigns a project name to a seventh outline node object data field, where the project name specifies a project that includes the program to which the program outline corresponds.

When the code outline unit 70 receives a user command indicating that a program outline is to be displayed, the user interface unit generates a seventh dialog box that facilitates the selection of a program outline by listing program outline files. After a particular program outline file has been selected, the code outline unit 70 opens the program outline file, and displays the outline node 80 corresponding to each outline node object 88 stored in the program outline file according to the preferred graphical format 74. The title associated with each outline node 80 is shown, and various icons and features are selectively shown in a given outline node 80 as will be described below.

In FIG. 5, six outline nodes 80 are present, namely, outline nodes 80 having titles of "Task 1," "Task 2," "Task 2.1," "Task 2.2," "Task 2.3," and "Task 3." The outline node 80 having a title of "Task 2" has a corresponding explanation shown in an explanation box 82. When an outline node 80 has a corresponding explanation, the code outline unit 70 displays a "latch" icon 84 within the outline node 80. Selection of the "latch" icon 84 causes the code outline unit 70 to show the corresponding explanation on the output device 16 in an explanation box 82. Preferably, the "latch" icon acts as a toggle switch for the display of the explanation box 82.

The outline nodes 80 having titles of "Task 1," "Task 2," and "Task 3" occupy a given outline level. The outline nodes 80 having titles of "Task 2.1," "Task 2.2," and "Task 2.3" occupy a deeper outline level than the outline nodes 80 having titles of "Task 1," "Task 2," and "Task 3," and are related to the outline node having a title of "Task 2." The code outline unit 70 selectively displays outline nodes 80 related to a given outline node 80 in response to the selection of an expansion feature 89 within the given outline node 80. In the preferred embodiment, the expansion feature 89 acts as a toggle switch. When the expansion feature 89 of a given outline node 80 has been selected, the code outline unit 70 examines the second outline node object data field in those outline node objects 88 in the program outline file that sequentially follow the outline node object 88 for the given outline node 80. The code outline unit 70 then displays the outline nodes 80 for those outline node objects 88 in which the second outline node object data field specifies a next-deeper outline level than that specified for the given outline node 80. Preferably, the code outline unit 70 graphically connects the given outline node 80 to each related outline node 80 via a relationship line 87 on the output device 16.

When an outline node 80 has a corresponding annotation, the code outline unit 70 displays an annotation icon 86 in the outline node. Selection of an annotation icon 86 within an outline node 80 causes the code outline unit 80 to present the corresponding annotation in a window on the output device 16.

In response to the selection of an outline node 80 itself with the input device 14, the code outline unit 70 transfers control to the token annotation unit 50. The token annotation unit 50 subsequently displays the block of program code corresponding to the program scope in the outline node object 88. During the display of the program code block, the token annotation unit 50 visually identifies each annotated token present according to the set of display styles. The code outline unit 70 resumes control of program outline display after the token annotation unit 70 determines that the window in which the annotation is displayed has been closed.

As long as the semantic ordering of the scopes within the set of program scopes identifying the program code blocks in a program are not changed, the program code corresponding to any outline node 80 will be properly displayed even when the program code has been modified. For example, the addition of new program code within an existing program code block will not present a problem as long as the existing program code block retains the same semantic ordering in the program with respect to other program code blocks. The code outline unit 70, in conjunction with the token parsing library 90, therefore provides a robust means for further documenting and displaying program code through a program outline.

In an alternate embodiment of the present invention, the code outline unit 70 could automatically generate a default program outline as a program is being executed. Automatic generation of the default program outline during program execution would be implemented by the creation of an outline node object for each scope encountered during program execution. After the default program outline has been generated, its corresponding outline nodes 80 could be modified in the manner described herein.

Figure 7A:
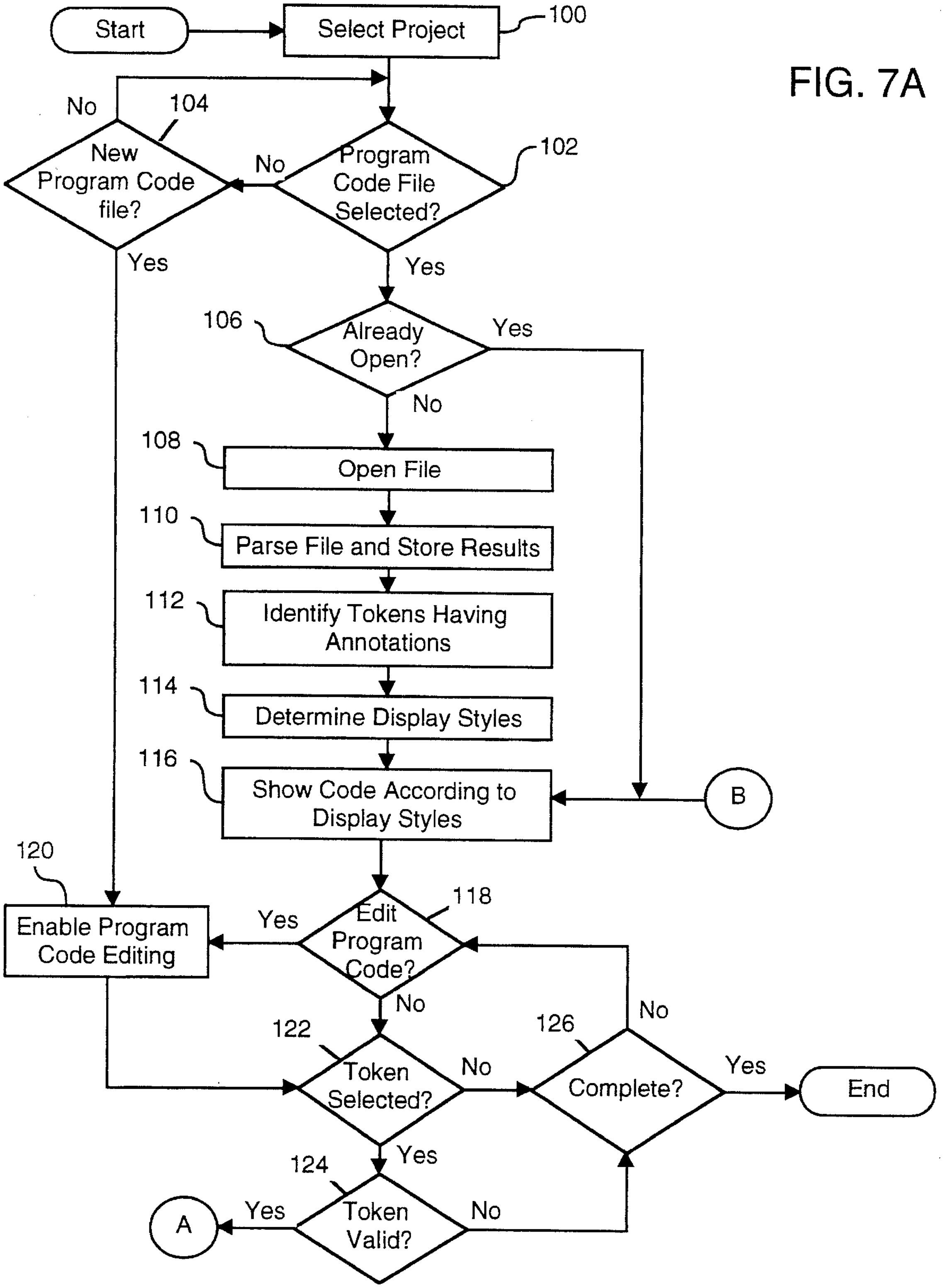
FIGS. 7A and 7B are a flowchart of a preferred method for displaying and annotating program code in accordance with the present invention.
Figure 7B:
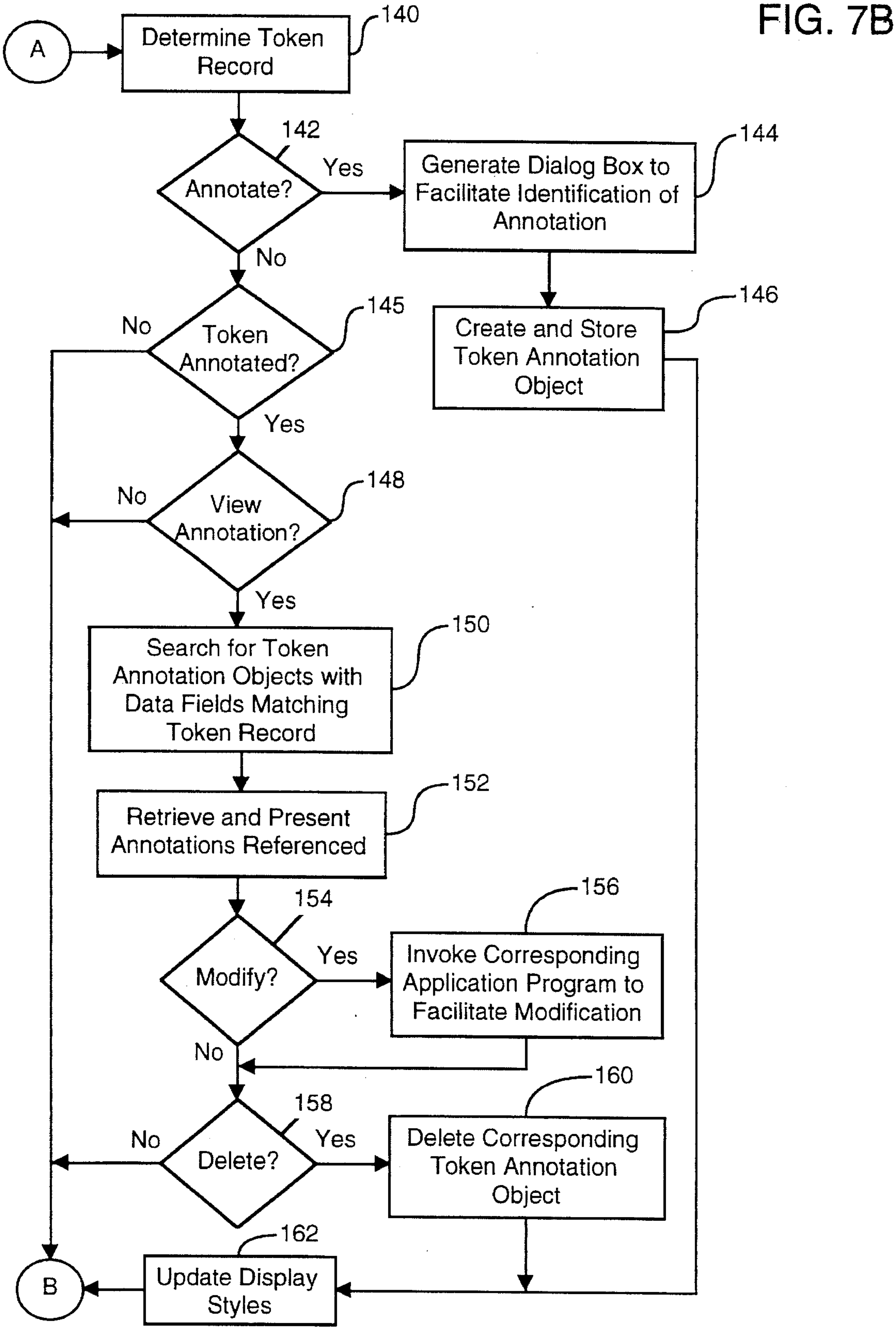

Referring now to FIGS. 7A and 7B, a preferred method for displaying and annotating program code in accordance with the present invention is shown. The preferred method begins in step 100 with the selection of a project that includes a program. Next, in step 102, the user interface unit 40 determines whether a program code file in the project has been selected by the user. If a program code file has not been selected, the user interface unit 40 next determines in step 104 whether the user has indicated that a new program code file is to be created. If a new program code file is not to be created, the preferred method returns to step 102.

If in step 102 the user interface unit 40 determines that a program code file in the project has been selected, the user interface unit 40 determines in step 106 whether the selected program code file is already open. If the selected program code file is not open, the user interface unit 40 opens the file in step 108. After step 108, the token parsing library 90 parses the program code file in step 110. In step 110, the token parsing library 90 also stores corresponding parsing results that include the token records and the set of program scopes in the parsing results database 98. Following step 110, the token annotation unit 50 determines which tokens in the program code file are annotated and the types of their corresponding annotations in step 112. Preferably, the token annotation unit 50 performs step 112 by comparing the contents of the annotated token list and each token annotation object file associated with the program code file with the token record for each token in the program code file. Next, in step 114, the token annotation unit 50 generates display styles for each token according to the results obtained in step 112. After generating the set of display styles, the token annotation unit 50 displays the program code with annotated tokens identified according to the set of display styles in step 116. Preferably, the set of display styles indicates that each annotated token is underlined and/or color-coded according to annotation type when displayed. If the user interface unit 40 determines in step 106 that the program code file is already open, then steps 108 through 114 have already been performed for the program code file, and the preferred method proceeds to step 116.

After step 116, the token annotation unit 50 determines whether the user has indicated that the program code is to be edited in step 118. If the program code is to be edited, the user interface unit 40 provides text editing functions that enable the user to edit the program code in step 120. If the token annotation unit 50 determines that the program code is not to be edited in step 118, or after step 120, the token annotation unit 50 determines whether the user has selected a token in step 122. If the user has not selected a token, the token annotation unit 50 determines whether the user has indicated that program code display and annotation is complete in step 126. If program code display and annotation is complete, the preferred method ends. If program code display and annotation is to continue, the preferred method returns to step 118.

If the token annotation unit 50 determines in step 122 that the user has selected a token, the token parsing library 90 next determines in step 124 whether the selected token is valid. The selection of blank spaces, for example, does not constitute a valid token. In the event that the user has selected an invalid token, the preferred method proceeds to step 126.

If token parsing library 90 determines in step 124 that the user has selected a valid token, the token parsing library 90 determines the token record corresponding to the selected token in step 140. Next, in step 142, the token annotation unit 50 determines whether the user has indicated that the selected token is to be annotated. Preferably, the user indicates that the selected token is to be annotated by choosing an annotation command from a menu. In the event that the selected token is to be annotated, the user interface unit 40 generates the first dialog box as was described earlier that enables the user to identify an annotation in step 144. After an annotation has been identified, the token annotation unit 50 creates and stores a corresponding token annotation object in step 146. After step 146, the token annotation unit 50 updates the set of display styles in step 162, after which the preferred method returns to step 116.

If the token annotation unit 50 determines in step 142 that the user has not indicated that the selected token is to be annotated, the token annotation unit 50 next determines whether the selected token has an annotation in step 145. Preferably, the token annotation unit 50 inspects the set of display styles to make this determination, since each annotated token is visually identified by the set of display styles. If the selected token has no corresponding annotation, the preferred method proceeds to step 116.

If the token annotation unit 50 determines in step 145 that the selected token has an associated annotation, the token annotation unit 50 next determines whether the user has indicated that the selected token's annotations are to be presented or viewed in step 148. If the token annotation unit 50 determines that the user does not require annotation viewing, the preferred method returns to step 116. In the event that the token annotation unit 50 determines in step 148 that the user has indicated that the selected token's annotations are to be viewed, the token annotation unit 50 searches the annotated token list and each token annotation object file related to the program for token annotation objects 52 having a token name, a token type, and a token scope that matches the token record determined for the selected token in step 150. After step 150, the token annotation unit 50 presents the annotations referenced by the token annotation objects 52 having a token name, a token type, and a token scope that match the token record of the selected token in step 152. If the selected token has multiple annotations, the user interface unit 40 preferably generates the third dialog box as was described earlier that enables the user to individually select each annotation to be presented. Next, in step 154, the token annotation unit 50 determines whether the user has indicated that an annotation is to be edited or modified in step 154. If the user has indicated that an annotation is to be modified, the token annotation unit 50 transfers control to the application program referenced in the corresponding token annotation object 52 to facilitate annotation editing in step 156. If the annotation to be modified is a text annotation, the user interface unit 40 preferably provides text editing functions rather than a separate application program.

Following step 156, or after step 154 in the event that the token annotation unit 50 determines that annotation modification is not required, the token annotation unit 50 determines in step 158 whether the user has indicated that a token annotation object 52 is to be deleted. Deletion of a token annotation object 52 deletes the association between the selected token and the annotation. If a token annotation object 52 is to be deleted, the token annotation unit 50 deletes the token annotation object 52 in step 160. After step 160, the preferred method proceeds to step 162. If the token annotation unit 50 determines that no token annotation object 52 is to be deleted in step 158, the preferred method proceeds to step 116.

Figure 8A:
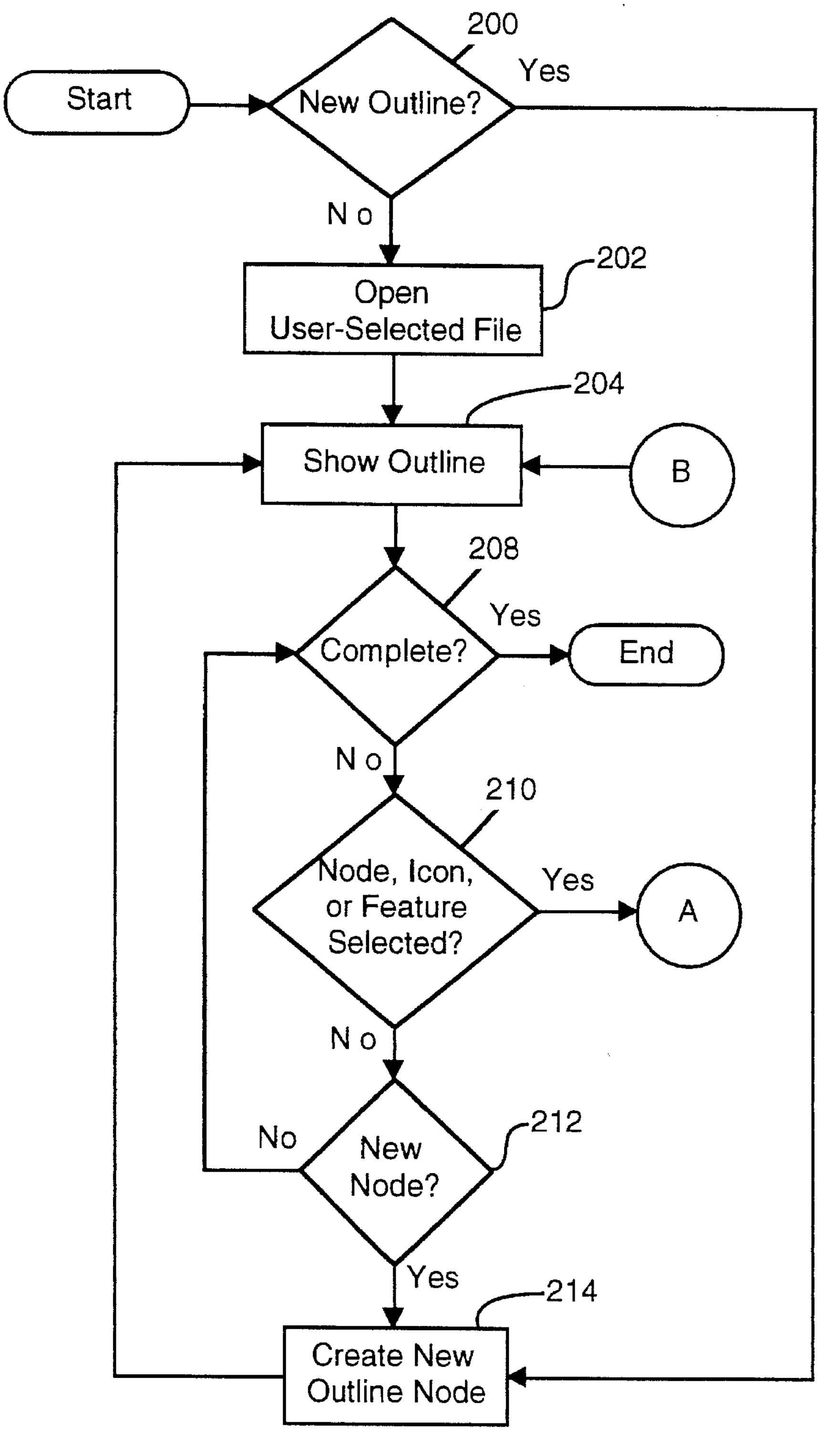
FIGS. 8A and 8B are a flowchart of a preferred method for outlining program code in accordance with the present invention.
Figure 8B:
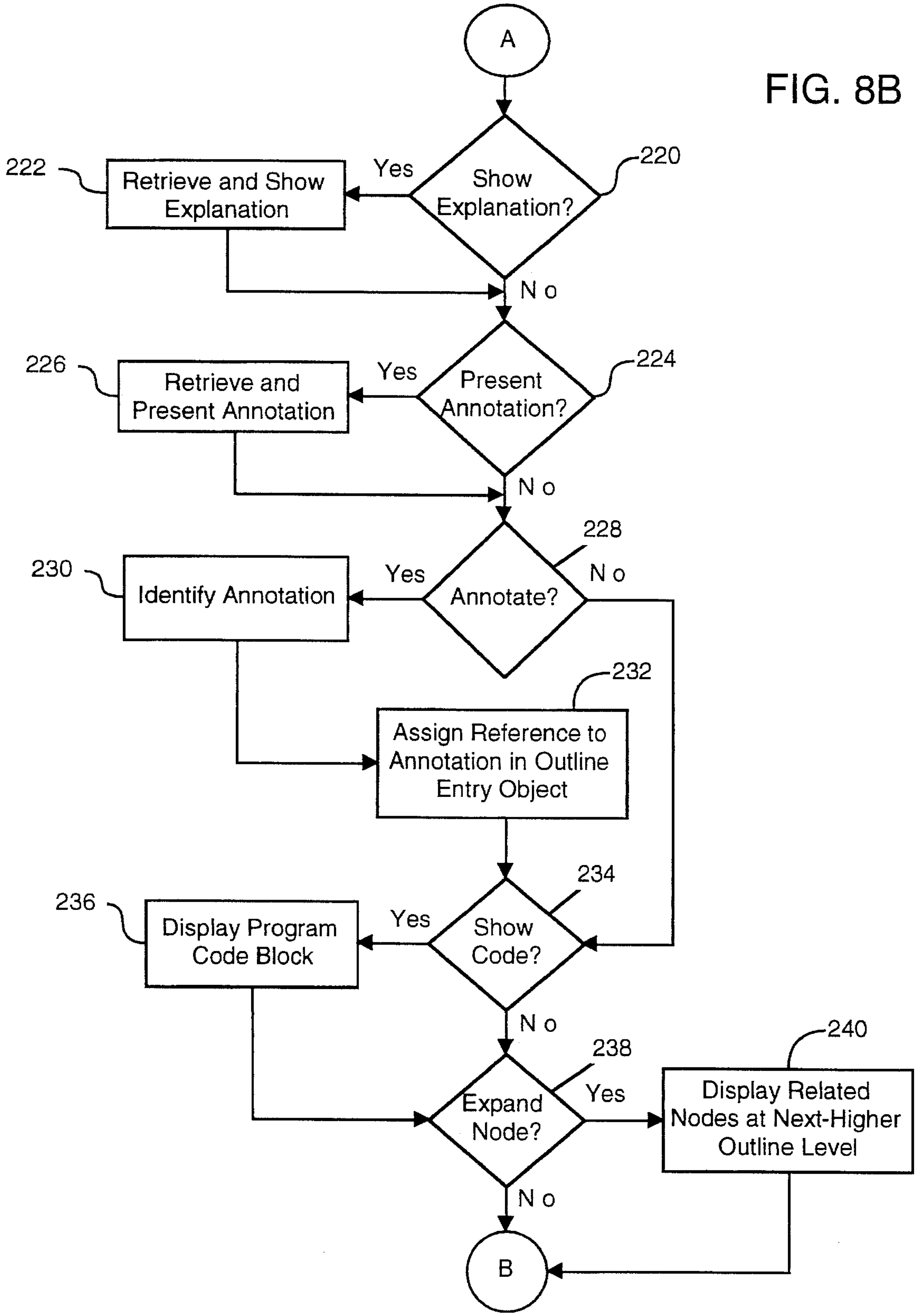

Referring now to FIG. 8A and 8B, a preferred method for outlining program code in accordance with the present invention is shown. The preferred method begins in step 200 with the code outline unit 70 determining whether the user has indicated that a new program outline is to be created. If a new program outline is not to be created, the code outline unit 70 opens a user-selected program outline file in step 202. Next, the code outline unit 70 displays the program outline in step 204. Preferably, the program outline is displayed in the preferred graphical format 74. The code outline unit 70 next determines whether the user has indicated that program outline viewing is complete in step 208. If so, the preferred method ends. If the code outline unit 70 determines in step 208 that program outline viewing is to continue, the code outline unit next determines whether the user has selected an outline node 80 or an icon or a feature corresponding to an outline node 80 in step 210. If no outline node 80 or corresponding icon or feature has been selected, the code outline unit 70 determines whether the user has indicated that a new outline node 80 is to be created in step 212. If no new outline node 80 is to be created, the preferred method returns to step 208. If the code outline unit 70 determines in step 212 that a new outline node 80 is to be created, the code outline unit 70 enables the user to create the new outline node 80 in step 214. Following step 214, the preferred method returns to step 204.

If it is determined in step 210 that an outline node 80 or a corresponding icon or feature has been selected, the code outline unit 70 determines in step 220 whether the outline node's explanation is to be shown. Preferably, the user indicates that the explanation is to be shown by selecting the "latch" icon 84 displayed with the outline node 80. If the outline node's explanation is to be shown, the code outline unit 70 retrieves and displays the corresponding explanation in an explanation box 82 in step 222. After step 222, or after step 220, the code outline unit 70 determines in step 224 whether the user has indicated that an annotation associated with the outline node 80 is to be shown. In the preferred graphical format 74, the user indicates that an annotation is to be shown by selecting the annotation icon 86 displayed within the outline node 80. If the code outline unit 70 determines in step 224 that an annotation is to be shown, the code outline unit 70 retrieves and presents the annotation to the user in step 226.

Next, in step 228, the code outline unit 70 determines whether the user has indicated that a new annotation is to be associated with the outline node 80. Preferably, the user indicates that a new annotation is to be associated with the outline node 80 by selecting an annotation command from a menu. If a new annotation is to be associated with the outline node 80, the user interface unit 40 generates the first dialog box as was described earlier that enables the user to identify a data file containing an annotation in step 230. In step 232, the code outline unit 70 stores a pointer to the data file containing the annotation in the outline node's corresponding outline node object 88 after the data file has been identified. After step 232, or after step 228, the code outline unit 70 determines whether the user has indicated that the program code block associated with the outline node 80 is to be shown in step 234. Preferably, the user indicates that the program code block is to be shown by selecting the outline node 80. If the program code block is to be shown, the token annotation unit 50 displays the program code block in step 236. The token annotation unit 50 performs step 236 according to FIGS. 7A and 7B. If the code outline unit 70 determines in step 234 that the program code block associated with the outline node 80 is not to be shown, or after step 236, the code outline unit 70 next determines whether the user has indicated that the outline node 80 is to be expanded to reveal its related nodes at the next-deeper outline level in step 238. Preferably, the user indicates that the node is to be expanded by selecting the outline node's expansion feature 89 when the program outline is displayed in the preferred graphical format 74. If the code outline unit 70 determines that the user has indicated that the outline node 80 is to be expanded, the code outline unit 70 displays the related outline nodes 80 at the next-deeper outline level in step 240. Following step 240, or if the code outline unit 70 determines in step 238 that the outline node 80 is not to be expanded, the preferred method returns to step 204.

Figure 9A:
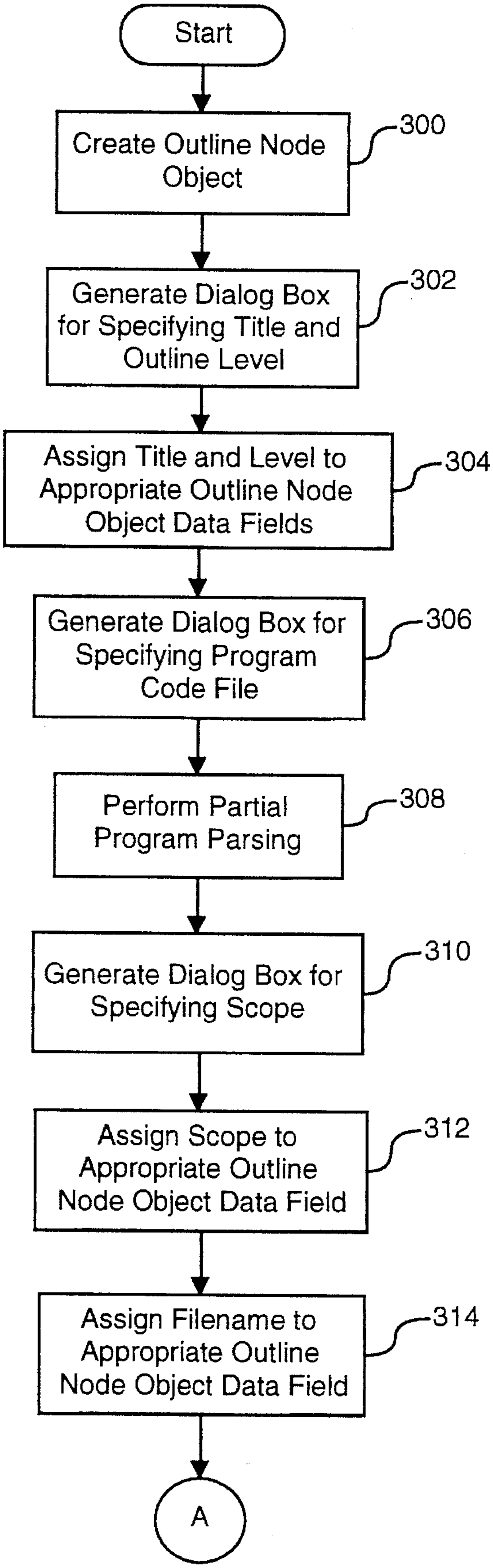
FIGS. 9A and 9B are a flowchart of a preferred method for creating a new outline node in the present invention.
Figure 9B:
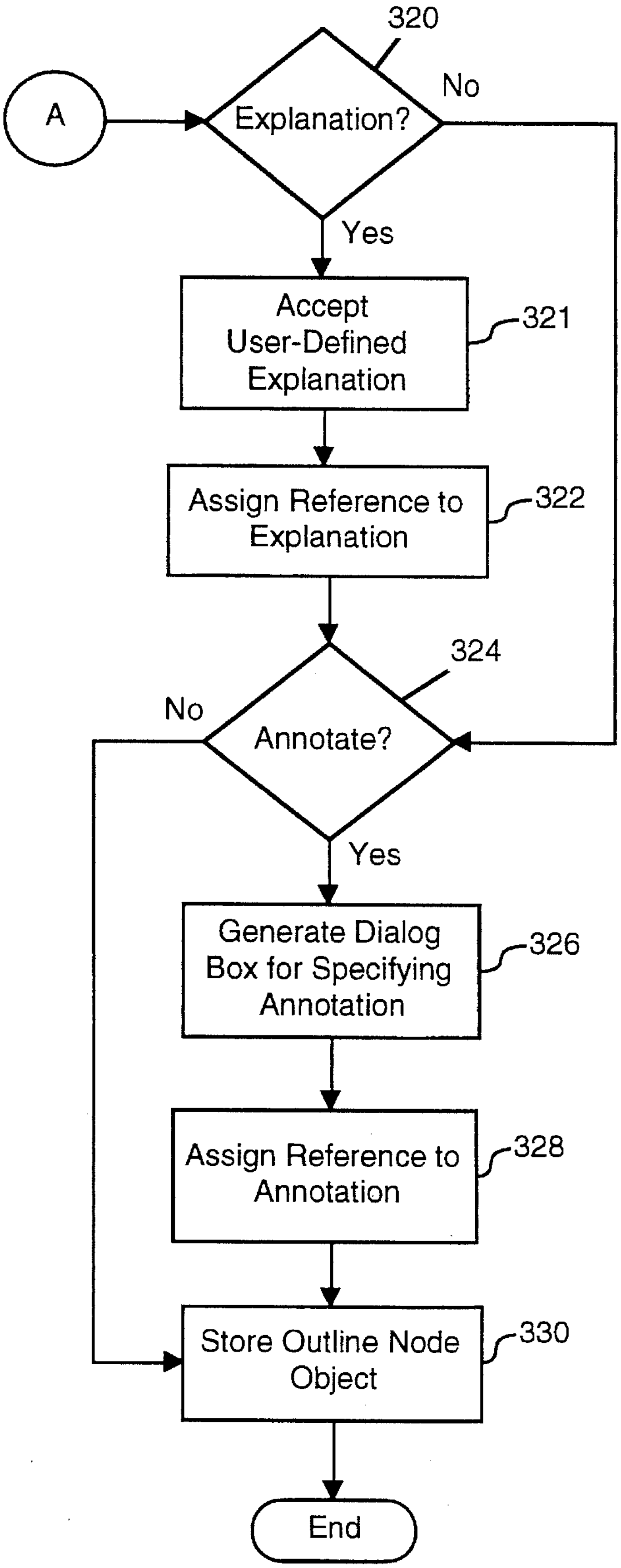

Referring now to FIGS. 9A and 9B, a preferred method for creating a new outline node 80 (step 214 of FIG. 8A) is shown. The preferred method begins in step 300 with the code outline unit 70 creating a new outline node object 88. Next, the user interface unit 40 generates the fourth dialog box on the output device 16 as was described above that enables the user to specify the title and the outline level corresponding to the outline node 80 in step 302. After step 302, the code outline unit 70 assigns the title and the outline level to the first and second outline node object data fields within the newly-created outline node object 88 in step 304. The user interface unit 40 next generates the fifth dialog box on the output device 16, enabling the user to select a program code file in step 306. Next, in step 308, the token parsing library 90 performs a partial parsing of the selected program code file and each related program code file to determine the set of program scopes if the selected program code file is not already open. After step 308, the user interface unit 40 generates the sixth dialog box on the output device 16 that enables the user to select a scope contained in the selected program code file in step 310. Following the selection of a scope contained in the selected program code file, the code outline unit 70 assigns the selected scope to the third outline node object data field in step code block to be associated with the outline node 80 in step 312. Next, in step 314, the code outline unit 40 assigns the filename of the program code file to the fourth outline node object data field in the outline node object 88.

After step 314, the code outline unit 70 determines whether the user has indicated that an explanation is to be associated with the outline node 80 in step 320. If so, the code outline unit 70 accepts an explanation as input by the user in step 321. Following step 321, the code outline unit 70 assigns a reference to the user-defined explanation to the outline node object 88 in step 322. After step 322, or if the code outline unit 70 determines in step 320 that no explanation is to be associated with the outline node 80, the code outline unit 70 determines whether the user has indicated that the outline node 80 is to be annotated in step 324. If the code outline unit 70 determines that the outline node 80 is not to be annotated, the preferred method proceeds to step 330. If the outline node 80 is to have a corresponding annotation, the user interface unit 40 generates the first dialog box on the output device 16 as was described above, facilitating the identification of a data file containing an annotation in step 326. After a given data file has been identified, the code outline unit 70 assigns a pointer to the data file containing the desired annotation to the outline node object 88 in step 328. Following step 328, the code outline unit 70 stores the outline node object 88 in step 330, after which the preferred method ends. Preferably, the outline node object 88 is stored in the memory 20.

While the present invention has been described with reference to certain preferred embodiments, those skilled in the art will recognize that various modifications may be provided. For example, the comment analyzer 55 could recognize the existence of a user-defined block name in a special type of comment. The user-defined block name would specify a user-defined scope, which the token annotation unit 50 and the code outline unit 70 could use in conjunction with the set of program scopes. The user-defined block name would be particularly useful for assigning a meaningful name to an unnamed block. This and other variations upon and modifications to the preferred embodiments are provided for by the present invention, which is limited only by the following claims.

What is claimed is:

1. Using a computer system having a processing unit, an input device and an output device, a method for displaying and annotating program code in a program code file, the program code file including a plurality of tokens, each token defined in accordance with a programming language, the method comprising the steps of:

retrieving and parsing the program code file to produce a token record having a token name, a token type, and a token scope for each of the plurality of tokens in the program code file;

retrieving a set of token annotation objects, each of the token annotation objects having a token name data field, a token type data field, a token scope data field and a reference to a corresponding annotation;

comparing each retrieved and parsed token record with the set of token annotation objects to determine whether the retrieved and parsed token record matches a token annotation object in the set of token annotation objects; and displaying on the output device the program code file with the tokens that have a matching token annotation object in a visually distinct manner.

2. The method of claim 1, wherein token annotation objects within the set of token annotation objects are stored in a comment section within the program code file.

3. The method of claim 1, wherein token annotation objects within the set of token annotation objects are stored in a token annotation object file.

4. The method of claim 1, wherein the step of comparing compares the token name, the token type, and the token scope of each token record with the token name data field, the token type data field, and the token scope data field of a token annotation object, respectively.

5. The method of claim 1, wherein the step of displaying displays tokens having one matching token annotation object in a first visually distinct manner, and tokens having more than one matching token annotation object in a second visually distinct manner.

6. The method of claim 5, wherein the first visually distinct manner is an underline, and the second visually distinct manner is a double underline.

7. The method of claim 1, wherein the visually distinct manner is an underline.

8. The method of claim 1, further comprising the steps of:

providing a set of display styles for displaying tokens having corresponding token annotation objects; and determining a display style for each token.

9. The method of claim 1, further comprising the steps of:

identifying a selected token specified by a user;

determining a token record corresponding to the selected token;

determining whether an annotation corresponding to the selected token is to be presented; and retrieving a token annotation object corresponding to the selected token, the token annotation object having a reference to a corresponding annotation; and displaying the corresponding annotation on an output device.

10. The method of claim 9, wherein the annotation includes one from the set of text, a sound, a picture, a movie, or an animation.

11. The method of claim 1, wherein the token name corresponds to a set of characters that identify the token in the program code file, the token type categorizes the token according to a manner of use in the program code file, and the token scope corresponds to a block of program code in which the token is defined.

12. The method of claim 1, further comprising the steps of:

identifying a selected token specified by a user;

determining the token record corresponding to the selected token;

determining whether an annotation is to be associated with the selected token; and identifying an annotation to be associated with the selected token; and creating a token annotation object wherein the token annotation object includes a copy of the token name, the token type, and the token scope in the token record determined for the selected token and a reference to the identified annotation.

13. The method of claim 1, further comprising the steps of:

identifying a selected token specified by a user;

determining the token record corresponding to the selected token;

determining whether an annotation corresponding to the selected token is to be presented; and locating a token annotation object having data fields that match the token name, the token type, and the token scope of the token record determined for the selected token;

retrieving an annotation referenced by the token annotation object having data fields that match the token name, the token type, and the token scope of the token record determined for the selected token; and presenting the annotation retrieved.

14. The method of claim 1, wherein the step of comparing each token annotation object with each token record comprises the substeps of:

searching for token annotation objects in each file in a project, the project including the program code file that contains the selected token.

15. An apparatus for displaying and annotating program code in a program code file having a plurality of tokens defined in accordance with a programming language, the apparatus comprising:

means for parsing the program code file to produce a token record having a token name, a token type, and a token scope for each of the plurality of tokens in the program code file, the parsing means having an input and an output, the input of the parsing means coupled to receive the program code file;

means for retrieving a set of token annotation objects, the retrieving means having an input and an output;

means for comparing each retrieved and parsed token record with the set of token annotation objects to determine whether the retrieved and parsed token record matches a token annotation object in the set of token annotation objects; said comparing means having a first input, a second input and an output, the first input of said comparing means coupled to the output of the parsing means and the second input of said comparing means coupled to the output of the retrieving means; and means for displaying the program code file with the tokens that have a matching token annotation object in a visually distinct manner, the displaying means having an input and an output, the input of the displaying means coupled to the output of said comparing means.

16. The apparatus of claim 15, wherein the determining means comprises:

means for searching for token annotation objects in each file in a project, the project including the program code files that contain a selected token.

17. The apparatus of claim 15, further comprising:

means for providing a set of display styles for displaying tokens having corresponding token annotation objects, the providing means having an input and an output, the input coupled to the displaying means; and means for determining a display style for each token, the display style determining means having an input and an output, the display style determining means having an input and an output, the input of the display style determining means coupled to the output of the determining means, and the output of the display style determining means coupled to the displaying means.

18. The apparatus of claim 15, further comprising:

means for identifying a selected token specified by a user;

means for determining the token record corresponding to the selected token;

means for determining whether an annotation corresponding to the selected token is to be presented;

means for retrieving a token annotation object corresponding to the selected token, the token annotation object having a reference to a corresponding annotation; and means for displaying the corresponding annotation on an output device.

19. The apparatus of claim 18, further comprising:

means for locating a token annotation object having data fields that match the token name, the token type, and the token scope of the selected token; and means for retrieving an annotation referenced by the token annotation object having data fields that match the token name, the token type, and the token scope of the selected token.

20. The apparatus of claim 18, further comprising:

means for determining whether an annotation is to be associated with the selected token;

means for identifying an annotation to be associated with the selected token; and means for creating a token annotation object wherein the token annotation object includes a copy of the token name, the token type, and the token scope in the token record determined for the selected token and a reference to the identified annotation.

* * * * *